United States Patent

Airheart

[15] 3,701,399
[45] Oct. 31, 1972

[54] RESETTABLE, FAIL-SAFE DISC BRAKE SYSTEM

[72] Inventor: Franklin B. Airheart, Granada Hills, Calif.

[73] Assignee: Airheat Products, Inc., Van Nuys, Calif.

[22] Filed: Oct. 21, 1970

[21] Appl. No.: 82,761

[52] U.S. Cl. ............. 188/71.8, 188/72.6, 188/72.9, 188/106 F, 188/196 B, 188/196 P
[51] Int. Cl. ............................................. F16d 65/52
[58] Field of Search .......... 188/71.7, 71.8, 72.1, 72.4, 188/72.6, 72.9, 106 F, 196 B, 196 P

[56] References Cited

UNITED STATES PATENTS

| | | | |
|---|---|---|---|
| 3,459,282 | 8/1969 | Hoenick et al. | 188/71.8 |
| 3,155,200 | 11/1964 | Halibrand | 188/196 P |
| 3,337,008 | 8/1967 | Trachte | 188/106 F |
| 3,371,753 | 3/1968 | Meier | 188/196 P |
| 3,458,017 | 7/1969 | Szymski | 188/196 B |

*Primary Examiner*—George E. A. Halvosa
*Attorney*—White, Haefliger & Bachand

[57] ABSTRACT

The invention concerns the combination comprising:

(a) a plunger and cylinder assembly, the plunger being responsive to fluid pressure application to advance relative to the cylinder to transmit actuating force for displacing a brake part into braking engagement with a relatively rotating disc, the brake part being subject to wear, and (b) auxiliary means to mechanically advance the plunger relative to the cylinder to displace said part into braking engagement with the disc, (c) said means including a ram element operatively connected with the plunger and there being interengagable load transmitting shoulders carried by said element and plunger located for relative shifting in one direction in response to predetermined plunger advancement relative to said means thereby to block retraction of the plunger relative to said means so as to compensate for brake part wear, (d) said shoulders being interrupted to be disengageable in response to relative rotation of said element and plunger to permit relative shifting of the shoulders in the opposite direction for re-setting of the element relative to the plunger.

15 Claims, 5 Drawing Figures

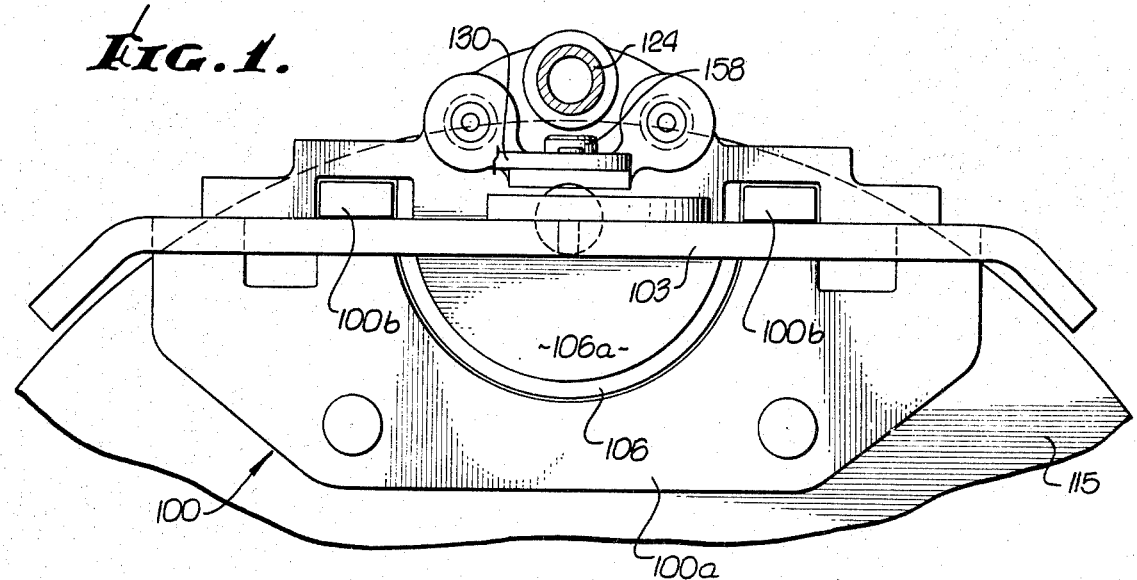
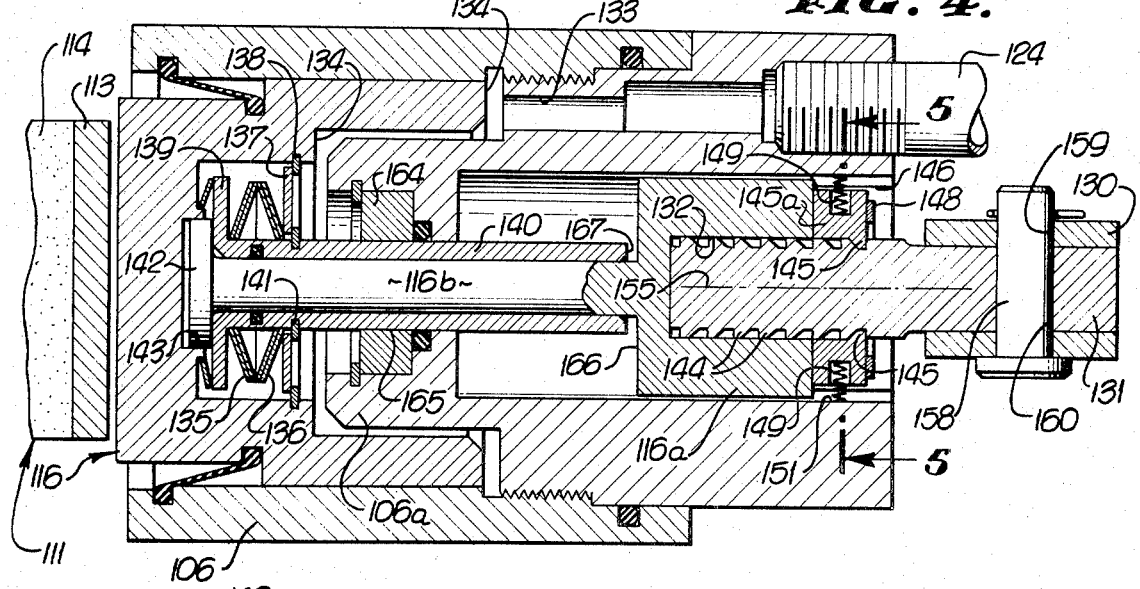
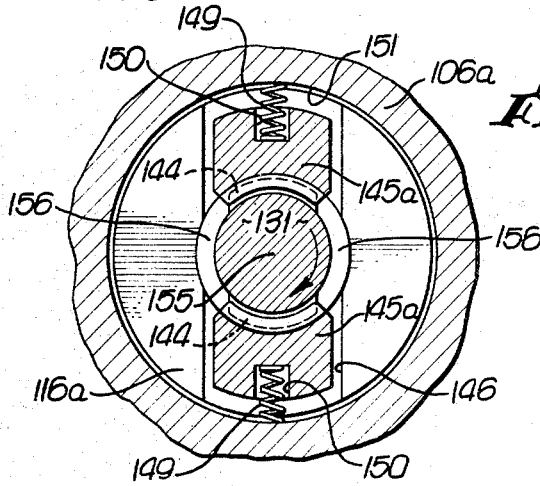

PATENTED OCT 31 1972

INVENTOR.
FRANKLIN B. AIRHEART
By White, Haefliger & Bachand
ATTORNEYS.

3,701,399

RESETTABLE, FAIL-SAFE DISC BRAKE SYSTEM

BACKGROUND OF THE INVENTION

This invention relates generally to disc brakes, and more particularly concerns disc brake lining wear compensation.

It is desirable in certain disc brake installations to provide for both fluid pressure responsive brake application and auxiliary mechanical application of the brake. Such dual mode braking is of advantage, for example, in vehicles where provision for emergency mechanical braking is made in addition to the normal fluid pressure responsive brake application.

Where a fluid pressure responsive plunger is employed to urge the brake lining toward the disc, wear of such lining is not an impediment to fluid pressure operation of the brake, since more fluid is simply displaced into the cylinder to stroke the plunger; however, such wear presents a serious problem as respects auxiliary mechanically effected stroking of the plunger inasmuch as mechanical linkages have limited ranges of movement, and mechanical advantage may tend to lessen with increasing length of the piston stroke to effect braking.

A highly advantageous way of overcoming the latter problem involves the provision of load transmitting shoulders carried by the plunger and by auxiliary means to mechanically advance the plunger toward the disc or moving part to braked, such shoulders being located for relative shifting, in response to predetermined plunger advancement, to block retraction of the plunger in such manner as to compensate for brake lining wear, as disclosed in that certain Gilliland et al. application Ser. No. 853,678 for U.S. Letters Patent entitled, "Disc Brake Wear Compensation," filed Aug. 28, 1969, now U.S. Pat. No. 3,610,375. A further problem introduced by the use of such shoulders has to do with re-setting them when the worn brake lining is to be replaced, there being need for the provision of structure and mode of operation enabling quick and simple re-setting of the shoulders. In addition, there is need for the provision in such environment for plunger retraction enabling retraction of the brake part to prevent its inadvertent engagement with the rotating disc, despite various conditions of wear of the brake part.

SUMMARY OF THE INVENTION

It is a major object of the invention to provide solutions for the above described problems, as well as other problems encountered in brake design and operation, through the provision of unusually simple and effective means for re-setting the auxiliary mechanical force transmitting element or elements, as at times when worn lining is replaced. Another object of the invention is to provide a disc brake construction having such advantages and also incorporating plunger retracting means which is shifted in compensating relation to brake part wear.

Basically, the invention is embodied in a disc brake assembly that includes, in combination, (a) a plunger and cylinder assembly, the plunger being responsive to fluid pressure application to advance relative to the cylinder to transmit actuating force for displacing a brake part into braking engagement with a relatively rotating disc, the brake part being subject to wear, and (b) auxiliary means to mechanically advance the plunger relative to the cylinder to displace said part into braking engagement with the disc, (c) said means including a ram element operatively connected with the plunger and there being interengagable load transmitting shoulders carried by said element and plunger located for relative shifting in one direction in response to predetermined plunger advancement relative to said means thereby to block retraction of the plunger relative to said means so as to compensate for brake part wear, (d) said shoulders being interrupted to be disengagable in response to relative rotation of said element and plunger to permit relative shifting of the shoulders in the opposite direction for re-setting of the element relative to the plunger.

Typically, certain of the shoulders may be defined by a series of flanges spaced in the direction of plunger advancement and retraction, the ram element having an axis and the flanges being circularly interrupted about that axis; and others of the shoulders may be defined by jaws carried by the plunger and yieldably urged toward the ram element, the jaws being circularly spaced about that axis whereby flange and jaw disengagement may be effected by relative rotation of the flanges and jaws to bring the flanges into the spaces between the jaws allowing axial shifting of the ram element relative to the plunger for re-setting purposes.

Further, means such as a spring may be operatively connected with the plunger to effect its retraction in response to decrease of fluid pressure application; a shiftable support may be carried by the cylinder which carries the plunger to receive loading exerted by the spring, and a retainer may be provided to frictionally resist advancement of the support with the plunger, the support being subject to advancement with the plunger against resistance imposed by the retainer, and in response to plunger advancement to compensate for wear of the brake part. As will be seen, the support may comprise a sleeve fitting over a plunger stem, and is such relation to the plunger and an extension thereof at opposite ends of the sleeve may be displaced in opposite directions (and against resistance imposed by the retainer) at times when the support is to be shifted by the plunger in one direction to compensate for lining wear, and in the opposite direction during re-setting of the assembly when a new brake part or lining is inserted.

The invention finds especial advantage where a carrier plate carries the plunger and cylinder assembly for lateral shifting relative to another plate to equalize wear of the linings on a pair of brake parts dropped into place in an opening in that other plate, as will be seen.

These and other objects and advantages of the invention, as well as the details of an illustrative embodiment, will be more fully understood from the following detailed description of the drawings, in which:

DRAWING DESCRIPTION

FIG. 1 is an elevation showing a disc brake and associated disc;

FIG. 4 is an enlarged vertical section showing the cylinder, plunger and self-adjustable means to compensate the brake for wear taken on line 4—4 of FIG. 2; and FIG. 5 is a section taken on line 5—5 of FIG. 4.

DESCRIPTION OF PREFERRED EMBODIMENT

Figure 3:
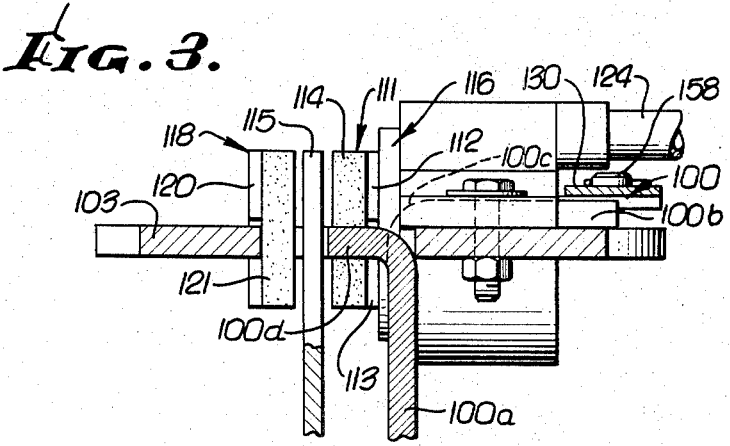
FIG. 3 is a vertical section taken on line 3—3 of FIG. 2.

In the drawings, the brake assembly includes support members one of which comprises an L-shaped mounting bracket 100 with vertical plate 100a suitably attached to a support flange, and horizontal plate ears 100b. The other support member comprises a horizontal plate 103 secured to ears 100b (as will be described) so as to be shiftable laterally relative thereto. Such shifting is accommodated by lateral reception of ears 100b.

Plate 103 defines an enlarged opening 110 through which the curved connections 100c between ears 100b and plate 100a project, as seen in FIG. 3. In addition, lugs 100d on the bracket project as shown, with longitudinal spacing therebetween in FIG. 2 to define a gap through which one clamping part 111 is dropped into place, that part then extending downwardly through opening 110 in plate 103. Lugs 112 on plate 113 of part 111 seat on bracket lugs 100d and support that clamping part during its lateral shifting movement carrying lining 114 into braking engagement with rotary disc 115. Such movement is effected by a piston or plunger 116 associated with cylinger 106, and engageable with plate 113.

Figure 2:
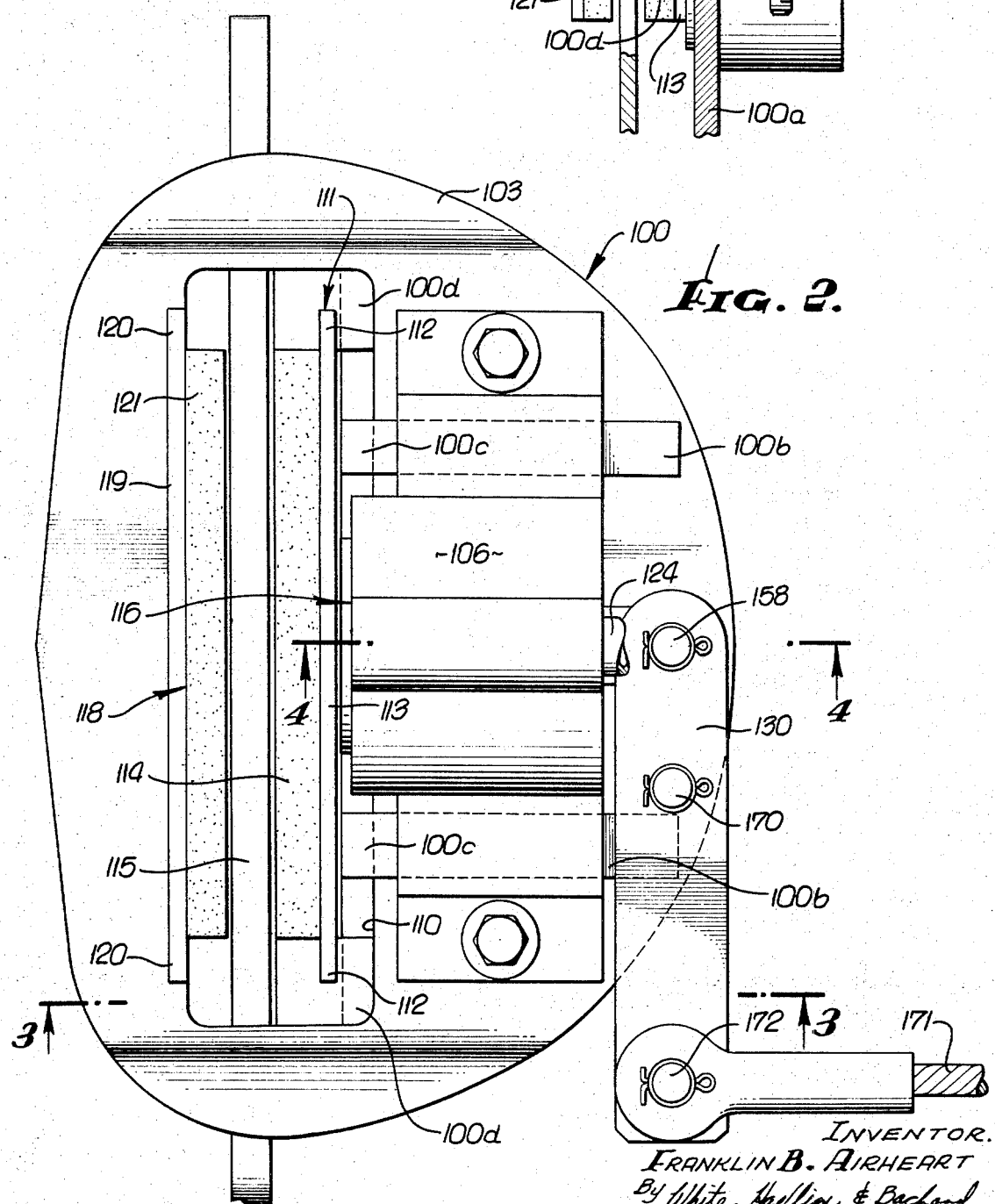
FIG. 2 is a top plan view of the FIG. 1 structure, the brake cylinder being cut-away to show interior construction.

The other clamping part 118 has a plate 119 with integral lugs 120 that seat on plate 103, as seen in FIG. 2. Lining 121 on plate 119 has braking engagement with disc 115 in response to the combined lateral shifting of lining 114 to engage the opposite side of disc 115, and lateral shifting of plate 103 to compensate for wear of the linings, and also tending to equalize such wear. A fluid pressure supply line for the cylinder 106 is seen at 124.

Auxiliary means is provided to mechanically advance the plunger 116 relative to the cylinder 106 to displace the brake part (as for example part 111) into clamping or braking engagement with the disc 115. Such means, as for example includes an actuator link 130 and ram element 131, is operatively connected to the plunger extension 116a. Also, interengageable load transmitting shoulders are carried by the ram element and the plunger, with location for relative shifting in response to predetermined plunger advancement relative to such means thereby to block relative retraction of the plunger so as to compensate for brake part wear.

The ram element 131 may advantageously comprise a sub-plunger received in a bore or recess 132 in the plunger extension 116. Application of fluid pressure via duct 133 to the plunger faces 134 tends to drive the plunger forwardly (leftwardly in FIGS. 2 and 4) against resistance imposed by a yieldable means such as the Belleville spring washers 135 and 136, whereby when the fluid pressure is relieved the plunger will be retracted rightwardly as the tapered spring washers expand. In this regard, annulus 137 is retained as shown between the washer 136 and a ring 138 coupled to the plunger, to transmit loading between the plunger and washers. Washer 135 bears against a flange 139 on a sleeve 140 to define a stop for the washers which is self-adjustable in accordance with brake lining wear as will appear. Another ring 141 coupled to the sleeve 140 stops rearward retraction of the plunger relative to the sleeve 140 by engaging the annulus 137 which moves with the plunger, as described.

The sleeve 140 extends coaxially about plunger stem 116b integral with the extension 116a, the stem being attached to the plunger 116 as by a flange 142 having press fit in bore 143. Further, the sleeve 140 is positioned axially by means of a drag ring 164 having frictional engagement at 165 with the sleeve. Accordingly, the sleeve cannot move axially and relative to the cylinder insert 106a unless it is forcibly displaced in response to predetermined force application. In this regard, as the lining wears and the plunger is sufficiently urged to the left in FIG. 4 by fluid pressure application, the end face or shoulder 166 on extension 116a will engage the end 167 of the sleeve, to drive it to the left when braking force is applied to the plunger 116, overcoming the resistance imposed by the drag ring 164. Accordingly, the retraction structure of the brake is self-compensating with lining wear.

When new lining is to be applied, the sleeve 140 may be displaced to the right against resistance imposed by the drag ring as by application of rightward force through the ram element 131.

In the illustrated embodiment, the interengageable shoulders referred to above may be considered to form a ratchet. Certain of such shoulders may advantageously be defined by a series of flanges 144 on the ram element 131 and axially spaced to be peripherally and successively engaged by another shoulder or shoulders carried by the plunger 116 as brake part (i.e. lining) wear progresses. FIGS. 4 and 5 show two such other shoulders defined by jaws 145 constructed to be spring urged inwardly toward the flanges 144 while remaining axially retained in grooves 146 formed by the plunger extension 116a as illustrated. See in this regard the retainer ring 148 carried by the plunger extension 116a and engaging the jaw bodies 145a, and the compression springs 149 received in the jaw body bores 150 and terminally engaging the bore 151 of cylinder insert 106a.

As the lining wears, the plunger 116 increases its leftward protrusion from the cylinder 106 in FIG. 4, displacing the plunger extension 116a and the jaws 145 to the left. Automatic ratcheting of the tapered jaws 145 over and between the tapered flanges 144 assures that the ram element 131 remains mechanically connected to the plunger 116 to enable effective auxiliary braking, when desired, in response to operation of an actuator 153 seen in FIG. 2, enhancing safety. Actuator 153 and link 130 normally retain the ram element against leftward movement with the plunger.

In accordance with an important aspect of the invention, the above referred to shoulders are interrupted to be disengageable in response to relative rotation of the ram element and plunger to permit relative shifting of the shoulders in the opposite direction for re-setting of the ram element relative to the plunger, as for example when the lining is replaced. In the illustrated embodiment and as better seen in FIG. 5, the ram flanges 144 are circulary interrupted about the ram axis 155, whereby two sets of diametrically opposed shoulders 144 are carried by the ram element, with circular spacing 156 there between.

At such time as the ram element is to be reset, a pin 158 is removed from the holes 159 and 160 in the link 130 and ram 131; next, the ram element is rotated about axis 155 to free the ram flanges 144 from the flanges 145, and then endwise displaced to the left relative to the plunger extension 116a, and to a position similar to that seen in FIG. 4; thereafter, the ram element is rotated to re-engage the flanges 144 and jaws 145 as seen in FIG. 5, and pin 158 is replaced.

Further, the ram may be pulled to the right to pull the plunger to the right and re-set the sleeve 140 against resistance imposed by the drag ring 164, as previously described. Accordingly, the mechanism may be quickly re-set when a new brake lining or brake part 111 is inserted.

It should finally be observed that the self-compensating mechanism described is itself carried on the plate 103 which shifts laterally relative to the support ears 100b on support plate 100a whose position is fixed relative to disc 115, all in such compensating relation as to tend to equalize the wear on the brake linings 114 and 121 carried by plate 103.

Accordingly, the advantages of equalized lining wear and ease of their replacement can now be combined in a simple structure with the advantage of automatic compensation of the auxiliary mechanically responsive braking mechanism, as described.

Link 130 may be pivoted at 170 to become a lever, as better shown in FIG. 2, and a hand operable cable or rod 171 may be connected to the lever at 172 to enable mechanical actuation of the brake, as for example during parking of a vehicle.

I claim:

1. In a disc brake, the combination comprising
   a. a plunger and cylinder assembly, the plunger being responsive to fluid pressure application to advance relative to the cylinder to transmit actuating force for displacing a brake part into braking engagement with a relatively rotating disc, the brake part being subject to wear, and
   b. auxiliary means to mechanically advance the plunger relative to the cylinder to displace said part into braking engagement with the disc,
   c. said means including a ram element operatively connected with the plunger and there being interengageable load transmitting shoulders carried by said element and plunger located for relative shifting in one direction in response to predetermined plunger advancement relative to said means thereby to block retraction of the plunger relative to said means so as to compensate for brake part wear,
   d. said shoulders being interrupted to be disengageable in response to relative rotation of said element and plunger to permit relative shifting of the shoulders in the opposite direction for re-setting of the element relative to the plunger,
   e. a support sleeve carried by the cylinder and a spring operatively connected in load transmitting relation between the sleeve and cylinder to yieldably resist advancement of the plunger and to effect retraction thereof relative to the sleeve in response to decreased fluid pressure application thereto, a drag ring carried by the cylinder and frictionally engaging the sleeve to frictionally resist advancement and retraction of the sleeve, and the sleeve extending about a stem portion of the plunger and located to be forcibly advanced at certain times by the plunger relative to the drag ring overcoming said frictional resistance to compensate for wear of said brake parts.

2. In a disc brake, the combination comprising
   a. a plunger and cylinder assembly, the plunger adapted to receive fluid pressure application to advance and displace a brake part in an axial direction,
   b. a plunger extension and an axial stem connecting the plunger and extension,
   c. a ram having ratchet connection to the plunger extension,
   d. a support sleeve extending about the stem and carried by the cylinder, and
   e. a spring adapted to be tensioned as the plunger advances and to effect retraction of the plunger upon decrease of said fluid pressure application, the support sleeve receiving loading exerted by the spring,
   f. there being a drag ring carried by the cylinder and frictionally engaging the sleeve to frictionally resist advancement and retraction of the sleeve, and the sleeve located to be forcibly advanced at certain times in response to plunger extension advancement and relative to the drag ring overcoming said frictional resistance to compensate for wear of said brake part.

3. The combination of claim 2, wherein the plunger extension and ram have interconnecting ratchet shoulders subject to disengagement in response to relative rotation of the ram and extension.

4. In a disc brake, the combination comprising
   a. a cylinder and a plunger subject to advancement therein to effect braking force application in response to fluid pressure application to the plunger,
   b. auxiliary means to effect auxiliary force application to the plunger independently of said fluid pressure application to produce plunger advancement,
   c. structure carried by and within the cylinder to effect plunger retraction in the absence of said plunger advancing pressure application, said structure including a sleeve shiftable in response to plunger advancement in compensating relation with wear of a brake part, and
   d. there being shoulders coupling said auxiliary means and plunger so as to shift in response to said wear,
   e. said structure also including a drag ring carried by the cylinder and frictionally engaging the sleeve to frictionally resist advancement and retraction thereof, a stem portion of the plunger projecting axially through the sleeve whereby the sleeve and plunger are intercoupled to enable said shifting of the sleeve.

5. The combination of claim 4, wherein said auxiliary means includes a lever and a hand operable mechanical connection to the lever to pivot same to effect said plunger advancement.

6. In a disc brake, the combination comprising a. a plunger and cylinder assembly, the plunger being responsive to fluid pressure application to advance relative to the cylinder to transmit actuating force for displacing a brake part into braking engagement with a relatively rotating disc, the brake part being subject to wear, and b. auxiliary means to mechanically advance the plunger relative to the cylinder to displace said part into braking engagement with the disc, c. said means including a ram element operatively connected with the plunger and there being interengageable load transmitting shoulders carried by said element and plunger located for relative shifting in one direction in response to predetermined plunger advancement relative to said means thereby to block retraction of the plunger relative to said means so as to compensate for brake part wear, d. said shoulders being interrupted to be disengageable in response to rotation of said ram element relative to the plunger to permit relative shifting of the shoulders in the opposite direction for re-setting of the element relative to the plunger, said ram element projecting to the exterior of said plunger and cylinder assembly to be exposed for quick manual re-setting as defined, and e. there being a sleeve extending about a stem portion of the plunger and carried by the cylinder, a drag ring carried by the cylinder and frictionally engaging the sleeve to frictionally resist advancement and retraction of the sleeve, and the sleeve located to be forcibly advanced at certain times in response to plunger advancement and relative to the drag ring overcoming said frictional resistance to compensate for wear of the brake part.

7. The combination of claim 6 wherein said shoulders define a ratchet.

8. The combination of claim 6 including removable means blocking relative rotation of said ram element and plunger.

9. The combination of claim 8 including an actuator releasably connected to the ram element to urge said ram element in the direction of plunger advancement.

10. The combination of claim 6, including means operatively connected with the plunger to effect retraction thereof in response to decrease of fluid pressure application thereto.

11. The combination of claim 10 wherein said last named means includes a spring contained by the plunger to be tensioned as the plunger advances.

12. The combination of claim 6, wherein certain of said shoulders are defined by a series of flanges spaced in said direction, the ram element having an axis and the flanges being circularly interrupted about that axis.

13. The combination of claim 12, wherein said flanges are on the ram element.

14. The combination of claim 13 wherein another of said shoulders is defined by a jaw carried by the plunger and yieldably urged toward the ram element.

15. The combination of claim 13 wherein others of said shoulders are defined by jaws carried by the plunger and yieldably urged toward the ram element, said jaws being circularly spaced about said axis whereby flange and jaw disengagement may be effected by relative rotation of the flanges and jaws to bring the flanges into the spaces between the jaws.

* * * * *